United States Patent
Uszkoreit et al.

(10) Patent No.: US 9,251,202 B1
(45) Date of Patent: Feb. 2, 2016

(54) CORPUS SPECIFIC QUERIES FOR CORPORA FROM SEARCH QUERY

(71) Applicant: Google Inc., Mountain View, CA (US)

(72) Inventors: Jakob D. Uszkoreit, San Francisco, CA (US); Percy Liang, Palo Alto, CA (US); Daniel M. Bikel, Mount Kisco, NY (US); Pravir K. Gupta, Mountain View, CA (US); Omer Bar-or, Mountain View, CA (US)

(73) Assignee: Google Inc., Mountain View, CA (US)

( * ) Notice: Subject to any disclaimer, the term of this patent is extended or adjusted under 35 U.S.C. 154(b) by 319 days.

(21) Appl. No.: 13/926,649

(22) Filed: Jun. 25, 2013

(51) Int. Cl.
*G06F 17/30* (2006.01)

(52) U.S. Cl.
CPC ................ *G06F 17/30424* (2013.01)

(58) Field of Classification Search
USPC .................... 707/723, 708, 731, 760
See application file for complete search history.

(56) References Cited

U.S. PATENT DOCUMENTS

| | | | |
|---|---|---|---|
| 5,212,821 A | 5/1993 | Gorin et al. | |
| 5,797,123 A | 8/1998 | Chou et al. | |
| 7,027,987 B1 * | 4/2006 | Franz et al. | 704/236 |
| 8,315,870 B2 * | 11/2012 | Hanazawa | G10L 15/1807 704/240 |
| 8,380,502 B1 * | 2/2013 | Franz et al. | 704/236 |
| 8,650,031 B1 * | 2/2014 | Mamou | G10L 15/08 704/2 |
| 2006/0190261 A1 | 8/2006 | Wang | |
| 2007/0018953 A1 * | 1/2007 | Kipersztok | G06F 17/30643 345/156 |
| 2009/0112593 A1 * | 4/2009 | Konig et al. | 704/251 |
| 2012/0290509 A1 | 11/2012 | Heck et al. | |
| 2013/0066889 A1 * | 3/2013 | Rodriguez et al. | 707/754 |

FOREIGN PATENT DOCUMENTS

| | | |
|---|---|---|
| EP | 834862 A2 | 4/1998 |
| WO | WO0014727 A1 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.

Chen et al., "Diverse Topic Phrase Extraction from Text Collection" WWW 2006, 9 pages.

Gorin et al., "An Experiment in Spoken Language Acquisition", IEEE Transactions on Speech and Audio Processing, 2 (1)(II), 1994, pp. 224-240.

(Continued)

*Primary Examiner* — Cam-Linh Nguyen
(74) *Attorney, Agent, or Firm* — Fish & Richardson P.C.

(57) ABSTRACT

A system determines search hypotheses for a search query, each search hypothesis defining a search type and respectively corresponding to a resource corpus of a type that matches the search type; for each search hypothesis, generate a hypothesis search query based on the search query and the search type and submits the hypothesis search query to a search service to determine a search hypothesis score, and for each search hypothesis having a search hypothesis score meeting a search hypothesis threshold, providing search results for the search operation performed for the hypothesis search query determined for the search hypothesis; and for each search hypothesis not having a search hypothesis score meeting a search hypothesis threshold, not providing search results for the search operation performed for the hypothesis search query determined for the search hypothesis.

17 Claims, 4 Drawing Sheets

(56) References Cited

OTHER PUBLICATIONS

Gupta et al., "Segmenting Spoken Language Utterances Into Clauses for Semantic Classification" in Automatic Speech Recognition and Understanding (ASRU 2003), 2003 IEEE Workshop, pp. 525-530.

Kawahara et al., "Topic Independent Language Model for Key-Phrase Detection and Verification", Acoustics, Speech, and Signal Processing, 1999, 1999 IEEE International Conference, pp. 685-688.

Krulwich et al., "Learning user information interests through the extraction of semantically significant phrases" AAAI Technology Report SS-96-05, Compilation, pp. 110-112.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet: http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SemanticRoleLabelingASRU05.pdf.

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng_ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages.

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

\* cited by examiner

CORPUS SPECIFIC QUERIES FOR CORPORA FROM SEARCH QUERY

BACKGROUND

This specification relates to search engine query processing systems.

The Internet provides access to a wide variety of resources, for example, video files, image files, audio files, book-related resources, web pages, etc. The resources are generally hosted on servers or server systems, which are computers that provide access to video and other resources over the Internet. The resources are accessed through uniform resource identifiers (URIs) such as uniform resource locators (URLs).

A search system crawls the Internet and indexes the resources in an index (or a set of indexes) for use in searching. The search system scores resources based on their relevance to a search query and on their importance relative to other resources. The search system provides search results that link to the resources, and the search results are typically ordered according to the scores.

As described above, there are different types of corpora, such as video, image, general web pages, books, products, and the like. A search engine can search the various corpora using different search algorithms, each algorithm designed for a specific corpus. Often users will provide a clear indication of the corpus or type of information from which they need information. Such indications may be from queries that provide a clear expression of the user's informational needs, or from providing the query on a search engine property specific to the corpus. An example of the former is a query [images of Empire State Building], which includes the unigram "images" and an entity "Empire State Building." An example of the latter is a search engine interface for books to search a book corpus.

However, often users provide queries with terms that are semantically irrelevant or of little relevance to a particular search. For such queries, the corpus or corpora that may have information the user may find useful is not readily identifiable to a search engine.

SUMMARY

In general, one innovative aspect of the subject matter described in this specification can be embodied in methods that include the actions of determining search hypotheses for a search query, each search hypothesis defining a search type and respectively corresponding to a resource corpus of a type that matches the search type; for each search hypothesis: generating a hypothesis search query based on the search query and the search type; submitting the hypothesis search query to a search service that performs a search operation on a resource corpus of the type that matches the search type of the search hypothesis and receiving, in response to the search of the resource corpus, data describing resources that are determined to be responsive to the hypothesis search query; determining, from the data describing the resources, a search hypothesis score; for each search hypothesis having a search hypothesis score meeting a search hypothesis threshold, providing search results for the search operation performed for the hypothesis search query determined for the search hypothesis; and for each search hypothesis not having a search hypothesis score meeting a search hypothesis threshold, not providing search results for the search operation performed for the hypothesis search query determined for the search hypothesis. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Determining hypothesis limits the number corpora that are searched, reducing system resources that are required relative to running parallel searches of all corpora. Additionally, precluding the showing results for which results having a respective hypothesis score that fails to meet a scoring threshold reduces the likelihood that the user will be presented with extraneous information. This, in turn, allows the user to focus more quickly on resources and information that is more likely to satisfy the user's informational need.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system determines search hypotheses for a search query that is received from a user device. Each search hypothesis defines a search type and respectively corresponds to a resource corpus of a type that matches the search type. For example, an image search hypothesis for an image type corresponds to an image corpus; a product search hypothesis for a product type corresponds to product corpus; and so on. Each corpus is a collection of resources of the type of the corpus or that describe entities of the corpus. For example, an image corpus primarily stores images; a product corpus primarily stores resources describing various commercial products; and so on.

For each search hypothesis, the system generates a hypothesis search query based on the search query and the search type. The hypothesis search query may differ from the received search query. The hypothesis search query is specific to the corpus that corresponds to the search hypothesis. The system then submits the hypothesis search query to a search service that performs a search operation on the corpus of the type that matches the search type of the search hypothesis. For example, the system submits the image hypothesis search query to a search service that searches an image corpus, and submits the product hypothesis search query to a search service that searches a product corpus.

For each search hypothesis, the system receives data describing resources that are determined to be responsive to the hypothesis search query of the search hypothesis, and determines from this data a search hypothesis score for the search hypothesis. For each search hypothesis having a search hypothesis score meeting a search hypothesis threshold, the system provides search results for the search operation performed for the hypothesis search query of the search hypothesis. Conversely, for each search hypothesis not having a search hypothesis score meeting a search hypothesis threshold, the system does not provide search results for the search operation performed for the hypothesis search query of the search hypothesis.

These features and additional features are described in more detail below.

Figure 1A:
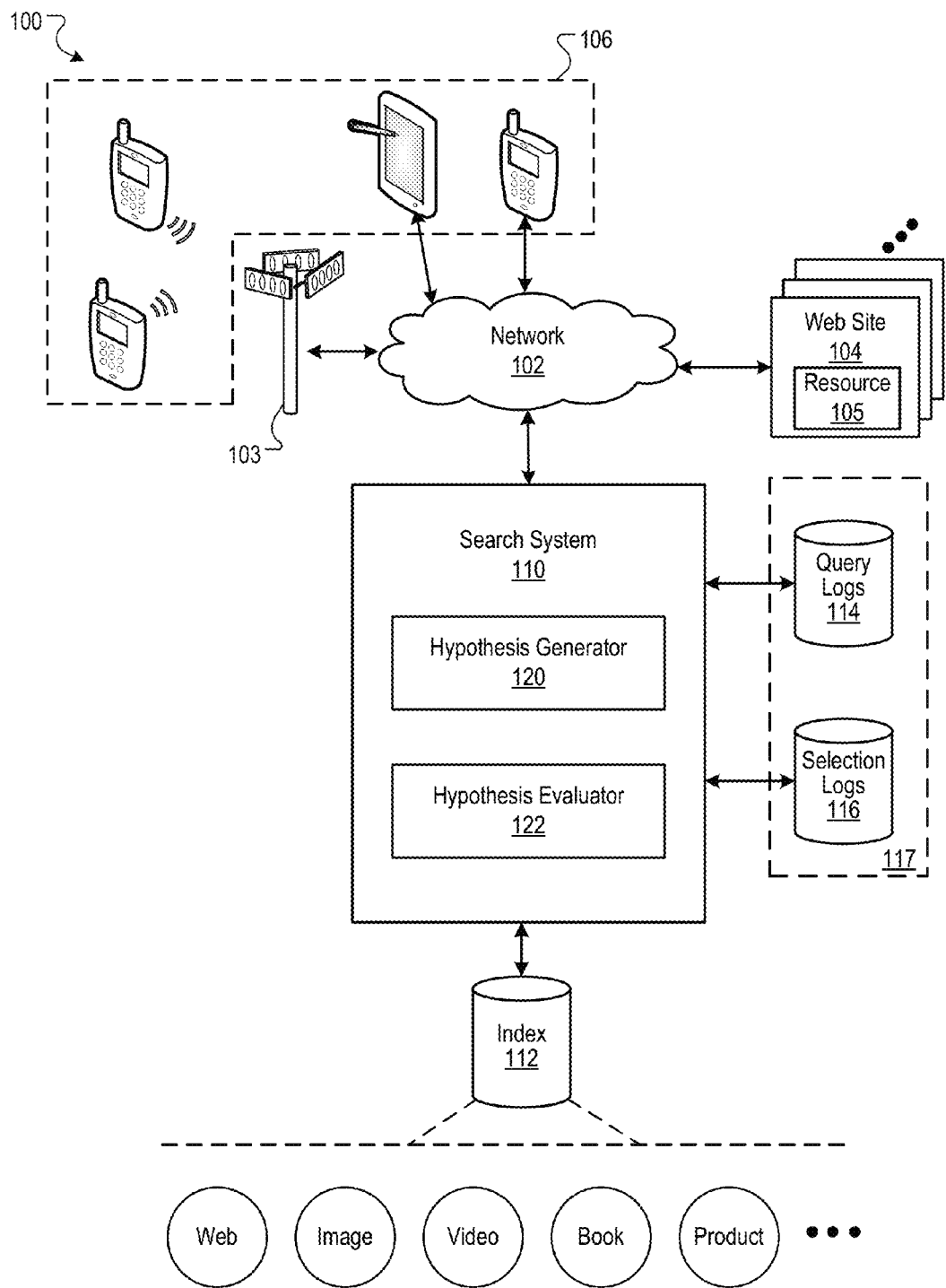
FIG. 1A is a block diagram of an environment in which corpus specific queries are generated and their respective results are evaluated.

FIG. 1A is a block diagram of an example environment 100 in which corpus specific queries are generated and their respective results are evaluated. A computer network 102, such as a local area network (LAN), wide area network (WAN), the Internet, or a combination thereof, connects publisher websites 104, user devices 106, and the search system 110, and a content item management system 120. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The application can enable a user to display and interact with text, images, videos, music and other information received from the publishers website 104. The user devices 106 may communicate over the networks 102 and 103 by means of wired and wireless connections.

To facilitate searching of these resources 105, the search system 110 identifies the resources by crawling the publisher websites 104 and indexing the resources provided by the publisher websites 104. The resources are indexed and the index data are stored in an index 112. Although the index 112 is depicted as a single entity, it can include multiple parts and different indexes. Furthermore, as described above, multiple corpora, each of a different content type, can be indexed. As shown in FIG. 1, an example of corpora includes a web corpus, an image corpus, a video corpus, a book corpus, and a product corpus. Other and different corpora can also be indexed as well.

The user devices 106 submit search queries to the search system 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index 112 to identify resources that are relevant to the queries. The search system 110 identifies the resources in the form of search results and returns the search results to the user devices 106 in search results page resource. A search result is data generated by the search engine 110 that identifies a resource or provides information that satisfies a particular search query.

Search results can take different forms, depending on the corpus searched. For example, for a web corpus, a search result for a resource can include a web page title, a snippet of text extracted from the web page, and a resource locator for the resource, e.g., the URL of a web page. For an image corpus, a search result can include a thumbnail of the image and a link to the resource hosting the image. For a book corpus, a search result can include an image of the book cover, and a link to a resource that includes a sample of the text from the book, and other information. Other appropriate search results are used for other corpora.

The search results are ranked based on scores related to the resources identified by the search results. The scores can differ based on the corpus searched. For example, for a web corpus, the scores can be based on information retrieval ("IR") scores, and optionally a separate ranking of each resource relative to other resources (e.g., an authority score). For an image search, the scores can be based on a selection rate of the image and the relevance of label terms to the query. Other scoring schemes are used for other corpora. The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search system 110. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search system 110 to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Often queries do not clearly express informational needs. Many search engines and user devices now use natural language processing for queries, and also use speech recognition systems. This has led to users providing queries with terms that are semantically irrelevant or of little relevance to a particular search. For example, a user may say [Get me some pictures of the Empire State building] when the user desires that a search for images of the Empire State building be done. Likewise, a user may say [I'd like a list of books John Steinbeck wrote] when the user desires that a search for books authored by John Steinbeck be done. Furthermore, even when some queries are terse, they are still ambiguous with respect to a particular corpus. For example, a user may input the query [show me some dance moves]. The user may desire to see images of dancers, videos of dances, or perhaps descriptions of certain dances.

While the search system 110 could search all corpora for each query, doing so would be inefficient and would likely result in the user being provided with search results that are of little interest to the user. Thus, in some implementations, the search system 110 includes a hypothesis generator 120 and a hypothesis evaluator 122. The example architecture of FIG. 1A is illustrative only, and other architectures and functional distributions can also be used. The hypothesis generator receives a query, determines hypotheses for the query, and for each hypothesis, generates a hypothesis search query. The hypothesis evaluator 122 evaluates, for each hypothesis search query, the results of the search of a corpus that corresponds to the corpus type of the hypothesis search query. Based on the evaluation, search results for the hypothesis search query may or may not be provided in response to the received search query. Operation is described with reference to FIG. 1B, which is a system flow of generating corpus specific queries and evaluating respective result sets, and FIG. 2, which is a flow diagram of an example process 200 for generating corpus specific queries and evaluating respective result sets.

Figure 1B:
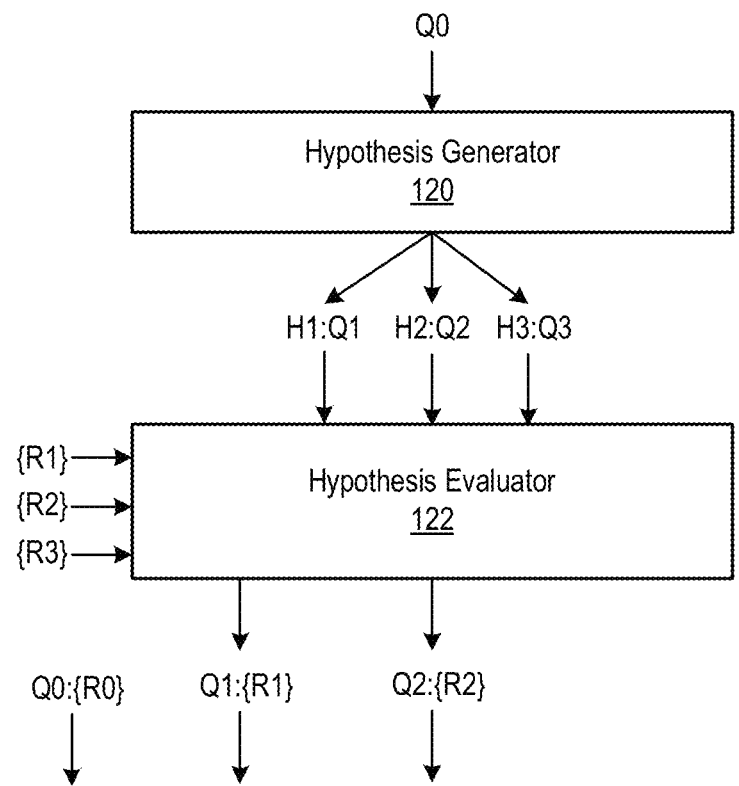
FIG. 1B is a system flow of generating corpus specific queries and evaluating respective result sets.
Figure 2:
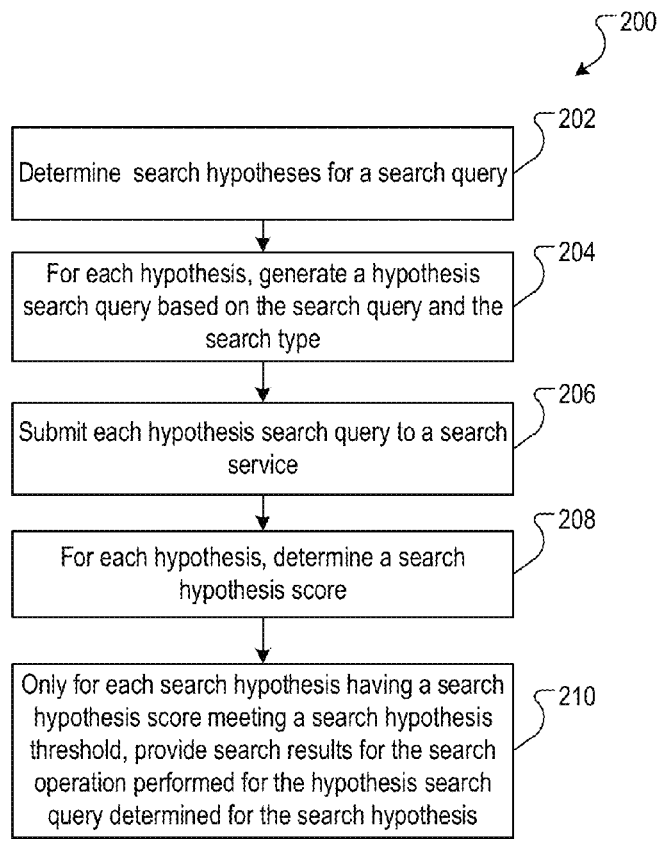
FIG. 2 is a flow diagram of an example process for generating corpus specific queries and evaluating respective result sets.

The hypothesis generator 120 determines search hypotheses for a search query (202). For example, for a received query, the hypothesis generator 120 determines possible corpora that would include information that would satisfy an informational need derived from the query. An example process for determining search hypothesis is described with reference to FIG. 3 below. In FIG. 1B, the hypotheses—H1, H2 and H3, are determined. For example, for the query [show me some dance moves], the first hypothesis may be an image type, the second hypothesis may be a video type, and the third hypothesis may be a book type.

For each hypothesis, the hypothesis generator 120 generates a hypothesis search query based on the search query and the search type (204). In some implementations, the hypothesis search query includes only terms from the received search query, or substitute terms substituted in the received search query. For example, for the first hypothesis, which is an image type, the hypothesis query may be [dance moves images]; for the second hypothesis, which is a video type, the hypothesis query may be [dance moves videos]; and for the third hypothesis, which is a product type, the hypothesis query may be [dance move instructional].

To generate the hypothesis query for a particular hypothesis, the hypothesis generator 120 can, in some implementations, first remove terms (or decrease term weights of terms) that are semantically irrelevant to the corpus type. For example, the hypothesis generator 120 can access a database that lists semantically relevant (and/or irrelevant) terms for a corpus type. For example, the terms "me" and "some" are removed for the image hypothesis. As these terms are also of little relevance for the other corpora, they are also removed. For the product corpus, the term "show" is also removed.

The hypothesis generator 120 can also substitute terms. For example, for the image hypothesis, the term "show" is substituted with "images," and for the video hypothesis, the term "show" is substituted with "videos."

The hypothesis generator 120 can also add terms. For example, for the product corpus, the term "instructional" is added, as there are instructional products for learning certain dance steps.

The above example is but one way hypothesis queries can be generated. Other appropriate processes for generating corpus-specific queries can also be used.

The hypothesis evaluator 122 submits each hypothesis search query to a search service (206). For each hypothesis query, the search query service performs a search of the corpus that corresponds to the hypothesis of the hypothesis query. For example, for the query [dance moves images], a search of an image corpus is performed; for the query [dance moves videos], a search of a video corpus is performed; and for the query [dance moves instructional], a search of a product corpus is performed. Respective results sets {R1}, {R2} and {R3} are provided. The results sets can be search results, or can be data identifying the underlying resources identified by the search results, or a combination of both.

For each hypothesis, the hypothesis evaluator 122 determines a search hypothesis score (208). For example, for each hypothesis search query, the data describing the resources determined to be responsive to the hypothesis search query is processed to determine a quality metric value. An example process of determining a search hypothesis score is described with reference to FIG. 4 below.

For only each search hypothesis having a search hypothesis score meeting a search hypothesis threshold, the hypothesis evaluator 122 provides search results for the search operation performed for the hypothesis search query determined for the search hypothesis (210). For example, with reference to FIG. 2, assume that the hypothesis score for the product hypothesis does not meet a search hypothesis threshold, but that the hypothesis scores for the image and video hypotheses do not meet respective search hypothesis thresholds. Accordingly, search results for images and videos responsive to the queries [dance moves images] and [dance moves videos] are provided.

In some implementations, the search system 110 may include a "default" search of a web corpus. For example, as shown in FIG. 1B, the original query Q0 is used to search the web corpus and search results {R0} are provided in response. Search results for a default search, in some implementations, are always provided. In other implementations, the search results for a default search are evaluated by the hypothesis evaluation as are other search result sets for other hypothesis search queries. Depending on the search hypothesis score, the search results for the default search may or may not be provided.

Figure 3:
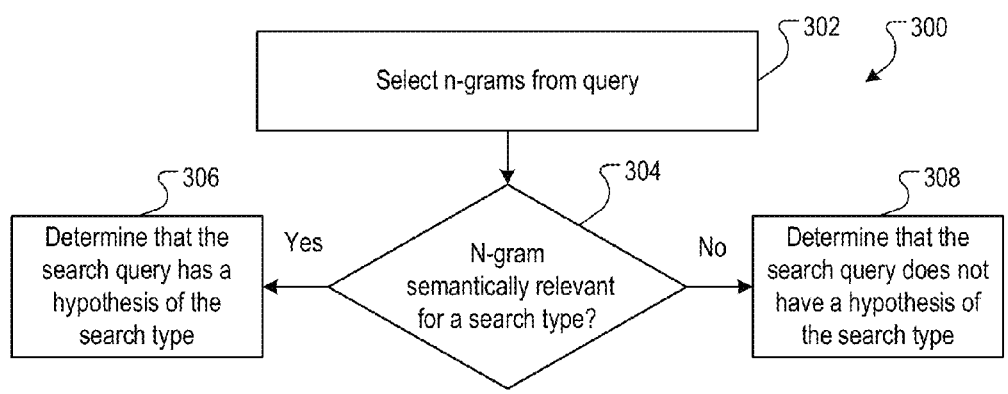
FIG. 3 is a flow diagram of an example process of determining search hypotheses.

FIG. 3 is a flow diagram of an example process 300 of determining search hypotheses. The process 300 is performed by the hypothesis generator 120. The hypothesis generator 120 receives the query and selects n-grams from the query (302). For example for the query [show me some dance moves], the n-grams may be "show," "me", "show me," "some" "dance," "moves", and "dance moves." In some implementations, expansion techniques, such as synonym and topical term expansion, can also be used.

The hypothesis generator 120 determines if an n-gram is semantically relevant for a search type (304). For example, for each potential hypothesis type, the hypothesis generator 120 can access a database that lists semantically relevant (and/or irrelevant) terms for a corpus type. Other types of relevance determination processes or data can also be used. For example, for the image hypothesis, the terms "show," "dance," "moves", and "dance moves," are determined to be relevant. Likewise, for the video hypothesis, the same terms are determined to be relevant. For the product hypothesis, however, only the terms "dance", "moves" and "dance moves" are determined to be relevant.

If an n-gram is semantically relevant for the search type, then the hypothesis generator 120 determines that the search query does have a hypothesis of the search type (306). Conversely, if none of the n-grams are semantically relevant for the search type, the hypothesis generator determines that the search query does not have a hypothesis of the search type (308).

In some implementations, instead of an n-gram being semantically relevant to a hypothesis type being a determining factor, the semantic relevance of the selected n-grams is measured, and if the resulting semantic relevance measure meets a threshold, the hypothesis generator 120 determines that the search query does have a hypothesis of the search type. For example, for the search types of image, video and product, the hypothesis generator 120 determines that the search query does have a hypothesis of the search type, as the semantic relevance measure for each type exceeds a threshold. However, for other corpora, such as news, books, etc., the respective semantic relevance measures do not meet a respective threshold and thus hypotheses of these types are not determined.

Figure 4:
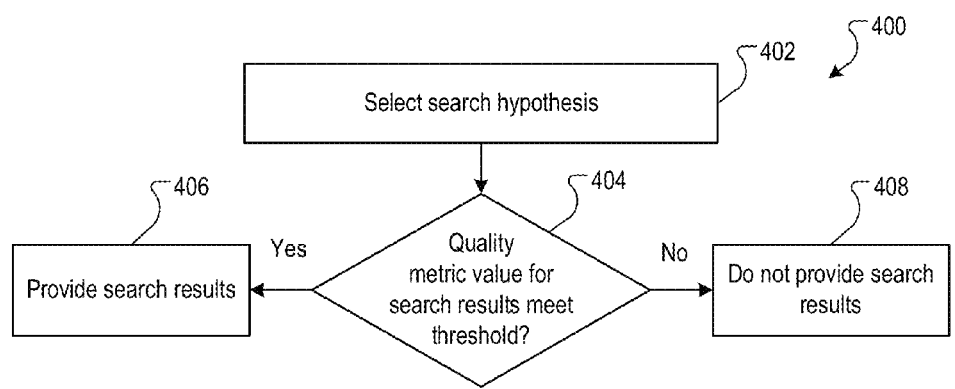
FIG. 4 is a flow diagram of an example process for determining whether to provide search results for a corresponding search hypothesis.

FIG. 4 is a flow diagram of an example process 400 for determining whether to provide search results for a corresponding search hypothesis. The process 400 is performed by the hypothesis evaluator 122.

The hypothesis evaluator 122 selects a search hypothesis (402). For example, the hypothesis evaluator selects each search hypothesis determined by the hypothesis generator 120 and evaluates each hypothesis for scoring.

The hypothesis evaluator 122 determines whether a quality metric value for search results responsive to the hypothesis search query for the selected hypothesis meets a threshold (404). A variety of different types of quality measures can be used to make this determination. For example, for data identifying resources identified in response to the search operation, a quality measure can be derived from quality scores of the resources.

The quality scores can be, for example, authority scores of the resources that measure the authority of each resource relative to other resources, relevance scores that measure the relevance of each resource to other resources, or scores based on combinations of authority scores and relevance scores.

Another quality measure can be based on scores for user behavior. For example, selection rates of search results can be determined from log data 117. The selection rates can be an average of the top-ranked search results (e.g., the top five search results), or can be highest selection rate from among the search results, etc. Thus in this implementation the quality measure is a measure of user satisfaction in response to the search results for a particular corpus.

The quality measure can also be a combination of a score derived from the resources identified by the search and a score derived from user interaction. Other types of quality measures can also be determined and used.

To determine whether the data meets a quality threshold, the hypothesis evaluator 122, in some implementations, compares the derived quality measure to a corresponding predefined threshold value. For example, for a selection rate quality measure, the threshold selection rate may be N %. Furthermore, the predefined value can be set by system administrators, or can be a machine learned value. Alternatively the quality threshold can be a dynamic value that is adjusted based on the underlying data provided.

If the quality metric value meets the threshold, then the hypothesis evaluator 122 allows for search results for the corresponding hypothesis search query to be provided. Conversely, if the quality metric value does not meet the threshold, then the hypothesis evaluator 122 precludes search results for the corresponding hypothesis search query from being provided.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   determining search hypotheses for a search query, each search hypothesis defining a search type and respectively corresponding to a resource corpus of a type that matches the search type, and wherein:
      the search type defined by each search hypothesis is different from the search type defined by each other search hypothesis, and
      each resource corpus of a particular type is different from a resource corpus of another, different type;
   for each search hypothesis:
      generating a hypothesis search query based on the search query and the search type defined by the hypothesis;
      submitting the hypothesis search query to a search service that performs a search operation on a resource corpus of the type that matches the search type of the search hypothesis and receiving, in response to the search of the resource corpus, data describing resources that are determined to be responsive to the hypothesis search query;
      determining, from the data describing the resources, a search hypothesis score for the search hypothesis;
   for each search hypothesis having a search hypothesis score meeting a search hypothesis threshold, providing search results for the search operation performed for the hypothesis search query determined for the search hypothesis; and
   for each search hypothesis not having a search hypothesis score meeting a search hypothesis threshold, not providing search results for the search operation performed for the hypothesis search query determined for the search hypothesis;
   wherein a plurality of search hypothesis scores are generated for the search hypotheses and a corresponding plurality of different corpora are searched by corresponding hypothesis search queries.

2. The computer-implemented method of claim 1, wherein determining search hypotheses for a search query comprises:
   parsing the query to select n-grams from the query; and
   for each selected n-gram, determining a search hypothesis based on a semantic relevance of the n-gram to the search type of the search hypothesis.

3. The computer-implemented method of claim 2, wherein determining search hypotheses for a search query further comprises determine at least one default hypothesis defining a general web corpus search type.

4. The computer-implemented method of claim 1, wherein generating a hypothesis search query based on the search query and the search type comprises generating a hypothesis search query having n-grams that are different from n-grams of the search query.

5. The computer implemented method of claim 1, wherein determining, from the data describing the resources, a search hypothesis score comprises determining a quality metric value for search results provided in response to the hypothesis search query.

6. The computer-implemented method of claim 5, wherein determining the quality metric value comprises determining a quality score that is a measure of quality of resources identified by the search results, the measure of quality being independent of user interactions at user devices.

7. The computer-implemented method of claim 5, wherein determining the quality metric value comprises determining a quality score that is a measure of user satisfaction in response to the search results, the measure of user satisfaction being dependent on user interactions with the search results at user devices.

8. The computer-implemented method of claim 1, wherein the search query is generated from voice command inputs.

9. A non-transitory computer readable storage medium storing instructions executable by a data processing apparatus and that upon such execution causes the data processing apparatus to perform operations comprising:
   determining search hypotheses for a search query, each search hypothesis defining a search type and respectively corresponding to a resource corpus of a type that matches the search type, and wherein:
      the search type defined by each search hypothesis is different from the search type defined by each other search hypothesis, and
      each resource corpus of a particular type is different from a resource corpus of another, different type;
   for each search hypothesis:
      generating a hypothesis search query based on the search query and the search type defined by the hypothesis;
      submitting the hypothesis search query to a search service that performs a search operation on a resource corpus of the type that matches the search type of the search hypothesis and receiving, in response to the search of the resource corpus, data describing resources that are determined to be responsive to the hypothesis search query;
      determining, from the data describing the resources, a search hypothesis score for the search hypothesis;
   for each search hypothesis having a search hypothesis score meeting a search hypothesis threshold, providing search results for the search operation performed for the hypothesis search query determined for the search hypothesis; and
   for each search hypothesis not having a search hypothesis score meeting a search hypothesis threshold, not providing search results for the search operation performed for the hypothesis search query determined for the search hypothesis;
   wherein a plurality of search hypothesis scores are generated for the search hypotheses and a corresponding plurality of different corpora are searched by corresponding hypothesis search queries.

10. The non-transitory computer readable storage medium of claim 9, wherein determining search hypotheses for a search query comprises:
    parsing the query to select n-grams from the query; and
    for each selected n-gram, determining a search hypothesis based on a semantic relevance of the n-gram to the search type of the search hypothesis.

11. The non-transitory computer readable storage medium of claim 10, wherein determining search hypotheses for a search query further comprises determine at least one default hypothesis defining a general web corpus search type.

12. The non-transitory computer readable storage medium of claim 9, wherein generating a hypothesis search query based on the search query and the search type comprises generating a hypothesis search query having n-grams that are different from n-grams of the search query.

13. The non-transitory computer readable storage medium of claim 9, wherein determining, from the data describing the resources, a search hypothesis score comprises determining a quality metric value for search results provided in response to the hypothesis search query.

14. The non-transitory computer readable storage medium of claim 13, wherein determining the quality metric value comprises determining a quality score that is a measure of quality of resources identified by the search results, the measure of quality being independent of user interactions at user devices.

15. The non-transitory computer readable storage medium of claim 13, wherein determining the quality metric value comprises determining a quality score that is a measure of user satisfaction in response to the search results, the measure of user satisfaction being dependent on user interactions with the search results at user devices.

16. The non-transitory computer readable storage medium of claim 9, wherein the search query is generated from voice command inputs.

17. A system, comprising:
a data processing apparatus; and
a non-transitory computer readable storage medium in data communication with the data processing apparatus storing instructions executable by the data processing apparatus and that upon such execution causes the data processing apparatus to perform operations comprising:
determining search hypotheses for a search query, each search hypothesis defining a search type and respectively corresponding to a resource corpus of a type that matches the search type, and wherein:
the search type defined by each search hypothesis is different from the search type defined by each other search hypothesis, and
each resource corpus of a particular type is different from a resource corpus of another, different type;
for each search hypothesis:
generating a hypothesis search query based on the search query and the search type defined by the hypothesis;
submitting the hypothesis search query to a search service that performs a search operation on a resource corpus of the type that matches the search type of the search hypothesis and receiving, in response to the search of the resource corpus, data describing resources that are determined to be responsive to the hypothesis search query;
determining, from the data describing the resources, a search hypothesis score for the search hypothesis;
for each search hypothesis having a search hypothesis score meeting a search hypothesis threshold, providing search results for the search operation performed for the hypothesis search query determined for the search hypothesis; and
for each search hypothesis not having a search hypothesis score meeting a search hypothesis threshold, not providing search results for the search operation performed for the hypothesis search query determined for the search hypothesis;
wherein a plurality of search hypothesis scores are generated for the search hypotheses and a corresponding plurality of different corpora are searched by corresponding hypothesis search queries.

* * * * *